(12) United States Patent
Beaman

(10) Patent No.: US 7,577,763 B1
(45) Date of Patent: Aug. 18, 2009

(54) MANAGING READ REQUESTS FROM MULTIPLE REQUESTORS

(75) Inventor: Alexander B. Beaman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 522 days.

(21) Appl. No.: 11/069,735

(22) Filed: Feb. 28, 2005

(51) Int. Cl.
*G06F 3/00* (2006.01)
*G06F 12/00* (2006.01)

(52) U.S. Cl. .......................................... 710/6; 711/162
(58) Field of Classification Search ................... 710/30, 710/6; 707/100; 711/162
See application file for complete search history.

(56) References Cited

U.S. PATENT DOCUMENTS

| | | | |
|---|---|---|---|
| 4,467,419 A | 8/1984 | Wakai | |
| 4,761,737 A | 8/1988 | Duvall | |
| 5,403,639 A | 4/1995 | Belsan | |
| 5,664,186 A | 9/1997 | Bennett | |
| 5,778,411 A | 7/1998 | DeMoss | |
| 5,864,867 A * | 1/1999 | Krusche et al. | 707/104.1 |
| 6,119,201 A * | 9/2000 | Kulakowski et al. | 711/112 |
| 6,233,648 B1 | 5/2001 | Tomita | |
| 6,311,193 B1 | 10/2001 | Seikido | |
| 6,434,553 B1 * | 8/2002 | Sekiguchi et al. | 707/4 |
| 2005/0144369 A1 * | 6/2005 | Jaspers | 711/105 |

OTHER PUBLICATIONS

Marshall Kirk McKusick et al., A Fast File System for UNIX, Feb. 18, 2004, University of California, Berkeley, 1-14.*

* cited by examiner

*Primary Examiner*—Henry W. H. Tsai
*Assistant Examiner*—Hyun Nam
(74) *Attorney, Agent, or Firm*—Hickman Palermo Truong & Becker LLP; Brian D. Hickman

(57) ABSTRACT

Techniques are described herein for expanding the range of data targeted in I/O requests made by clients, so that the expanded range results in aligned I/O operations within the file system. Data that is included in the expanded range, but was not actually requested by the client, is trimmed off the data chunk returned by the file system, so that the client receives only the data required by the client. The blocks that contain the partially-read data are cached, so that they can be provided to the clients in response to subsequent I/O requests, without having to retrieve the blocks again from the file system. The I/O requests of multiple clients are handled by a read scheduler that uses a single global queue for all such requests. When appropriate, the read scheduler creates companionship relationships between the requests, and services the "companion" requests based on the data returned for the requests with which the companion requests are associated.

26 Claims, 3 Drawing Sheets

MANAGING READ REQUESTS FROM MULTIPLE REQUESTORS

FIELD OF THE INVENTION

The present invention relates to performing I/O operations directed to data managed by a file system.

BACKGROUND

Frequently, access to electronic information stored on storage devices is managed through a file system. Often, the stored information is physically or logically divided into blocks. For example, a storage device may logically divide data into 1K blocks. Thus, a file that includes 2K bytes may include a first block of data corresponds to the address range 0 to 1023, and a second block of data corresponds to the address range 1024-2047.

When clients access data managed by a file system, I/O requests are sent to the file system to perform the I/O operations. The data that is specified, by the client, as the target of a requested I/O operation is referred to herein as the "target chunk". When the boundaries of the target chunk coincide with the boundaries of the blocks that contain the target chunk, then the I/O operation is referred to as an "aligned" I/O operation. On the other hand, if the boundaries of the target chunk do not coincide with the boundaries of the blocks that contain the target chunk, then the I/O operation is referred to as an "unaligned" I/O operation.

Frequently, storage devices and/or file systems are designed to perform aligned I/O operations more efficient than unaligned I/O operations. Consequently, retrieving an entire block may be more efficiently than retrieving a target chunk that is only a subset of the block. Similarly, retrieving two blocks may be more efficient than retrieving a target chunk that spans but does not fully include the two blocks.

Unfortunately, the I/O operations required by clients are not always aligned, and it would place an undue burden on client developers to require clients to be designed to only request aligned I/O operations.

Other types of inefficiencies may occur if I/O operations are not managed intelligently. For example, if the read requests issued to the file system by one application are not coordinated with the read requests issued by other applications, then the file system may, for example, have to retrieve to same block many times in succession. In addition, if applications are responsible for directly sending their own read requests to the file system, then the timing of read requests that have deadlines may have to be handled by the applications themselves, making the applications more complex than desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. For example, scenarios presented hereafter use 1K for the size of blocks and pages, thereby simplifying the examples. However, the size of storage blocks and memory pages may vary greatly from implementation to implementation, and will frequently be larger (e.g. 4K or 32K) than 1K. It will be apparent, however, that the present invention may be practiced without these specific details. In other instances, well-known structures and devices are shown in block diagram form in order to avoid unnecessarily obscuring the present invention.

Overview

Techniques are described herein for expanding the range of data targeted in I/O requests made by clients, so that the expanded range results in aligned I/O operations within the file system. Data that is included in the expanded range, but was not actually requested by the client, is trimmed off the data chunk returned by the file system, so that the client receives only the data required by the client. The blocks that contain the partially-read data are cached, so that they can be provided to the clients in response to subsequent I/O requests, without having to retrieve the blocks again from the file system.

Techniques are also provided for tracking requests from multiple clients using a single request queue and in-flight list. When new read requests are received from clients, the contents of the request queue and in-flight list are inspected to determine whether the new request is covered by a previously received request.

System Overview

Figure 1:
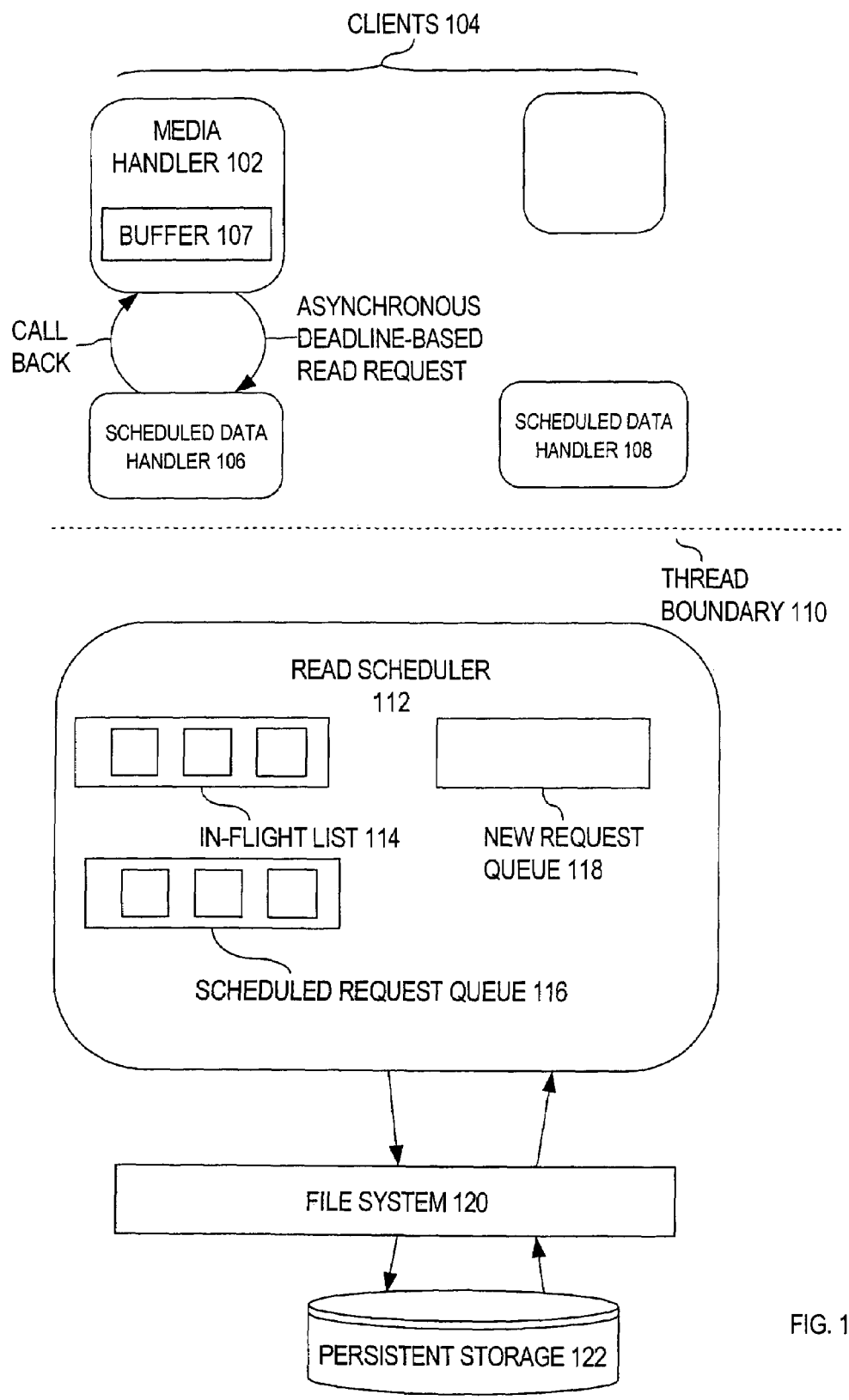
FIG. 1 is a block diagram of a system in which a read scheduler maintains an in-flight list and request queue, according to an embodiment of the invention.

Referring to FIG. 1, it is a block diagram that illustrates a system configured according to an embodiment of the invention. Specifically, a plurality of clients 104 make I/O requests to a file system 120 via an intermediary, referred to herein as a read scheduler 112. Read scheduler 112 then coordinates with file system 120 to provide the clients 104 with the data they require in a manner that conforms to any deadlines specified by the clients 104. Media handler 102 is an example of a type of client that requires a significant amount of I/O activity, during activities such as the playback or editing of digital audio and/or video files.

When media handler 102 requires data from the file system 120 (e.g. the next segment of a video), media handler 102 allocates a buffer 107 to receive the data, and requests the data from the appropriate scheduled data handler. Different scheduled data handlers may provide data for different types of media. For example, scheduled data handler 108 may be used to schedule reads for video data, while scheduled data handler 108 is used to schedule reads for audio data.

For the purpose of illustration, it shall be assumed that media handler 102 sends a request to scheduled data handler 106. Scheduled data handler 106 then sends the request to read scheduler 112. According to one embodiment, scheduled data handler 106 sends request to read scheduler 112 by obtaining a mutex that governs access to a new request queue 118, placing the request on the new request queue 118, releasing the mutex, and sending signal to read scheduler 112.

In many situations, such read requests not only indicate the target chunk of data required by the client, but also indicate a deadline by which the client expects the data to be in the buffer. Using such deadline-based requests increases the flexibility of the system by allowing the requests to be handled asynchronously, while still ensuring that the data will be available to the clients when it is needed.

Many scheduled data handlers, servicing many clients, may place requests on the new request queue 118 of read scheduler 112. Under some situations, many of those several clients may even be reading data from the same file. For example, during the playback of a movie, a video handler may be issuing read requests for the video data in a movie file, while a sound handler is concurrently issuing read requests for the audio data in the same file.

To track the requests, read scheduler 112 maintains the new request queue 118, a scheduled request queue 116, and an in-flight list 114. When the read scheduler 112 becomes aware of newly arrived requests on the new request queue 118, the read scheduler 112 moves the entries from the new request queue 118 onto the scheduled request queue 116. The scheduled request queue 116 includes an ordered list of entries for I/O requests that (1) have been received from clients, but (2) have not yet been passed to the file system 120. According to one embodiment, the entries in the scheduled request queue 116 are ordered according to deadline and position in file, as shall be described in greater detail hereafter. The in-flight list 114 includes entries for requests that (1) have been passed to the file system 120, but (2) have not yet been fully provided to the client. How read scheduler 112 maintains these structures shall be described in greater detail hereafter.

The Request Queue

When read scheduler 112 receives a read request from a client, the request typically specifies (1) a file, (2) an offset into the file, (3) an amount of data to retrieve, and (4) a deadline by which to perform the read operation. Such requests are moved from the new request queue 118 into the scheduled request queue 116 in an order that is based on the corresponding deadline, where the request with the nearest deadline is at the head of the scheduled request queue 116 (the "head request) and the request with the furthest deadline is at the tail of the scheduled request queue 116.

To the extent that multiple requests specify the same deadline, the relative order of those requests on the scheduled request queue 116 is based on the file offset order of the requests. For example, assume that the scheduled request queue 116 already includes a request associated with time T1 and offset 512. If a second request associated with time T1 arrives, the second request may be placed ahead of the existing request if the second request is associated with offset 256, or after the existing request if the second request is associated with the offset 900.

When the current time is within some threshold of the deadline of the head request, the read scheduler 112 sends to the file system 120 requests for the read operations required by the head request. The specific read operations requested by the read scheduler 112 may be adjusted to achieve block-aligned and page-aligned I/O, as shall be described in greater detail hereafter.

In response to sending to the file system 120 the I/O requests for the head request, the head request is moved from the scheduled request queue 116 to the in-flight list 114. The read scheduler 112 then checks the deadline associated with the new head request. If the deadline for the new head request is also within the threshold, it is processed in a like manner. This process continues until either the scheduled request queue 116 is emptied, or the read scheduler 112 encounters a new head request whose deadline is not within the threshold of the current time. Because requests with the same deadline are ordered based on file offset, and the read scheduler 112 processes the requests based on their order within the scheduled request queue 116, requests associated with the same deadline are submitted to the file system 120 in an order that is dictated by their file offset.

According to one embodiment, a request can be promoted within the scheduled request queue 116 ahead of its deadline order under certain circumstances. For example, a later request may be promoted to be nearer another, higher-ranked request based on the fact that the later request is for I/O on the same file as the higher-ranked request.

The In-Flight List

The in-flight list is a list of the requests that have been requested of the file system 120, but not yet fulfilled by the file system 120. When a request is fulfilled by the file system 120, and the necessary data has been provided to the client that requested the data, the request is removed from the in-flight list.

As shall be described in greater detail hereafter, to achieve block-aligned and page-aligned read operations, a request for a single target chunk may actually result in three I/O requests issued by the read scheduler 112 to the file system 120. According to one embodiment, a request is not removed from the in-flight list until all of the corresponding I/O requests to the file system 120 have been completed.

Conservation of Computing Resources

According to one embodiment, read scheduler 112 is implemented as a thread that executes separate from the clients that are serviced by the read scheduler 112. In one embodiment, the separate thread of the read scheduler 112 is given a higher priority than the client threads, to ensure that I/O based deadlines are not jeopardized by heavy processor usage of the client threads.

However, there may be periods during which read scheduler 112 has little to do. During these periods, continuing to execute the read scheduler 112 would waste computing resources, particularly if the read scheduler 112 is assigned high priority relative to the clients. Therefore, according to one embodiment, read scheduler 112 is configured to stay in an inactive state until an event occurs that causes read scheduler 112 to "wake up" and perform some action.

In one embodiment, the read scheduler 112 wakes up when any of the following events occur: (1) a new request arrives from a client, (2) a requested read operation is completed by the file system 120, and (3) a timer elapses.

According to one embodiment, before the read scheduler 112 goes inactive, the read scheduler 112 sets the timer based on the deadline associated with the head request. The timer is set such that, if no other event wakes the read scheduler 112 in the meantime, the timer will wake the read scheduler 112 in time for the read scheduler 112 to service the head request in a manner that meets the deadline associated with the head request. If there is no head request (i.e. the scheduled request queue 116 is empty), then the read scheduler 112 may set the timer to a point in the distant future (virtually forever).

When the read scheduler 112 becomes active, the read scheduler proceeds through the following stages:

(1) issues I/O requests to the file system for any requests on the scheduled request queue whose deadline is within a certain threshold, (2) responds to any I/O operations that have been completed by the file system 120, (3) moves any requests on the new request queue 118 to the appropriate locations on the scheduled request queue 116, (4) sets the wake-up time of the timer based on the deadline associated with the head request, (or if there is no head request, the wake-up time is set to the distant future) and (5) goes to sleep.

According to one embodiment, the read scheduler 112 does not go to sleep until all of the necessary file requests have been issued, all of the completed I/O operations have been handled, and all of the new requests have been moved to scheduled request queue 116. For example, assume that the read scheduler 112 has processed all previously-completed I/O operations and is about to go to sleep. At this point, if the file system completes another I/O operation, then the read scheduler 112 will handle the newly completed I/O operation prior to going to sleep. In one embodiment, the read scheduler 112 repeatedly performs stages (1) to (3), and only moves to stages (4) and (5) after an iteration in which there was nothing to do in stages (1) to (3).

Adjusting I/O Requests to Achieve Block Aligned I/O Operations

Figure 2:
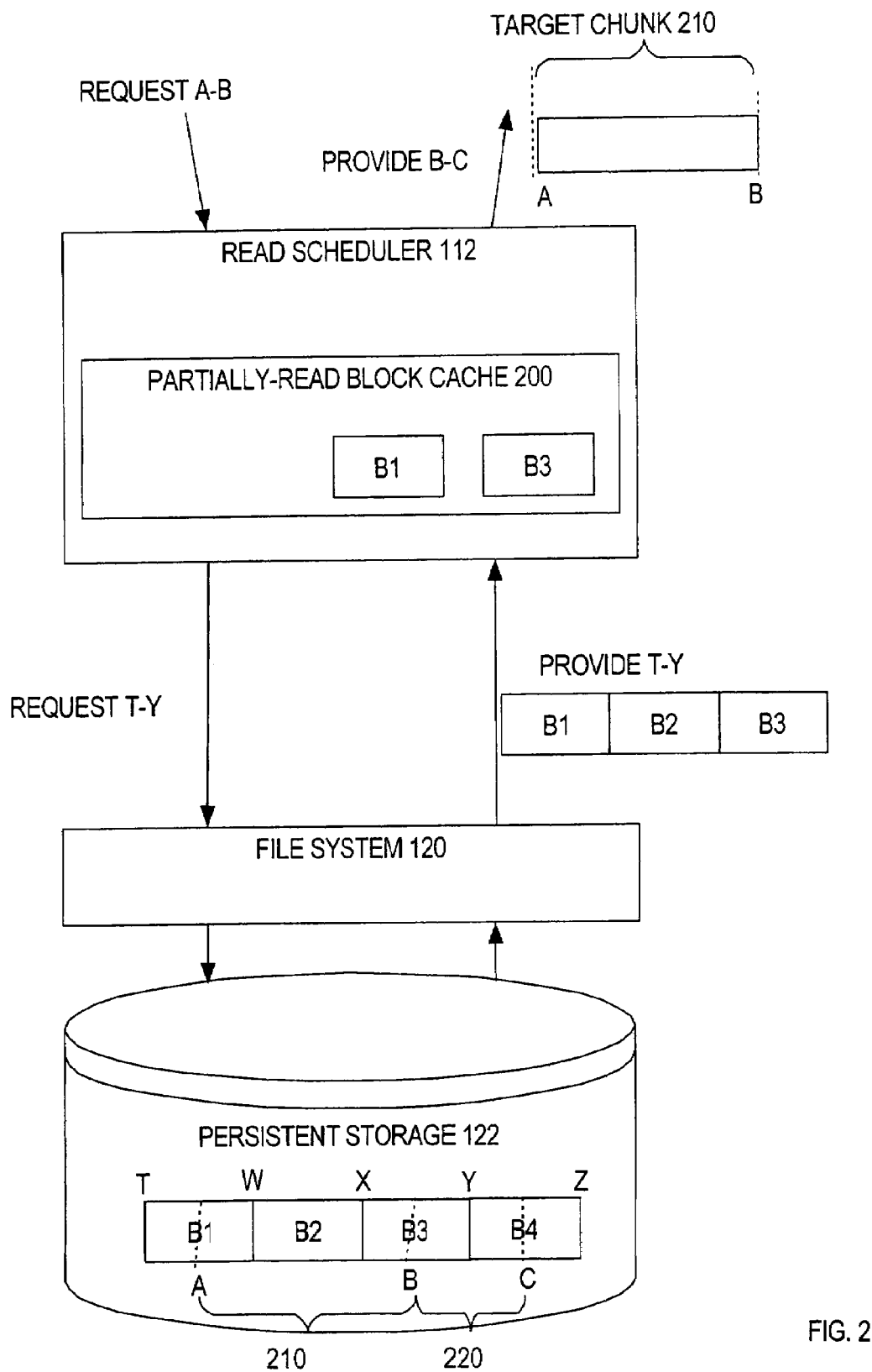
FIG. 2 is a block diagram of a read scheduler that expands the range of requests so that the requests conform to block boundaries, and caches partially-read blocks, according to an embodiment of the invention.

FIG. 2 is a block diagram that illustrates how read scheduler 112 adjusts I/O requests before the requests are issued to file system 120. In the illustrated example, persistent storage 122 includes four blocks B1, B2, B3 and B4. Read scheduler 112 receives a read request for a target chunk 210 that spans but does not entirely include the blocks B1, B2 and B3. Specifically, the target chunk 210 specified in the request is for the data that falls in the range A-B, which includes some of block B1, all of block B2, and some of block B3.

When read scheduler 112 receives the request, read scheduler 112 expands the range specified in the request in a way that results in a block-aligned I/O operation. Specifically, if the lower boundary of the requested range does not coincide with a block boundary, then the lower boundary of the requested range is adjusted down to the nearest block boundary. Conversely, if the upper boundary of the requested range does not coincide with a block boundary, then the upper boundary of the requested range is adjusted up to the nearest block boundary. In the present example, A would be adjusted down to T, and B would be adjusted up to Y. Therefore, the adjusted range would be T-Y, which exactly includes blocks B1, B2 and B3.

The requests that are sent from read scheduler 112 to file system 120 cover all data in the adjusted range T-Y. In response to the requests, file system 120 performs aligned I/O operations to read blocks B1, B2 and B3 and return the blocks requested by the read scheduler 112. Before providing the data from blocks B1 and B3 to the client, read scheduler 112 trims the data so that the client does not receive the portions of blocks B1 and B3 that do not fall in the originally requested range A-B. As shall be described in greater detail hereafter, the process of trimming may involve having the file system 120 copy the blocks B1 and B3 into a buffer maintained by the read scheduler 112, and then having the read scheduler 112 copy the appropriate portions of those blocks into the client's buffer. In the present example, before the data is returned to the client, data from the range T-A is trimmed off B1, and data from the range B-Y is trimmed off B3. Thus, even though the I/O operations performed by file system 120 involve some data that was not requested by the client, the client only receives the data that was actually requested by the client.

The "trimming" of the retrieved data may be achieved using a variety of techniques. The present invention is not limited to any particular technique. However, various techniques for performing the "trimming" shall be described in greater detail hereafter.

The Partially-Read Block Cache

In the example described above, blocks B1 and B3 contained portions that (1) were retrieved from the file system 120, but (2) were not requested by the client. Such blocks are referred to herein as "partially-read" blocks.

It is not uncommon for a read operation that involves one portion of a block to be followed by a read operation that involves some or all of the data in the remainder of the block. Thus, in the example given above, there may be high likelihood that the request for target chunk 210 (range A-B) may be followed by a request for a target chuck 220 (involving range B-C).

If block B3 was retrieved by read scheduler 112 in response to the request for target chunk 210, then it would be inefficient to turn around and again retrieve block B3 from persistent storage for a subsequent read operation that involves target chunk 220. To avoid the need to re-retrieve the same block in rapid succession, read scheduler 112 includes a partially-read block cache 200.

When an I/O operation performed by read scheduler 112 results in retrieval of one or more partially-read blocks, read scheduler 112 stores the partially-read blocks in partially-read block cache 200. When read scheduler 112 receives a request for a target chunk, read scheduler 112 determines whether some or all of the target chunk resides in blocks stored in partially-read block cache 200. To the extent that the target chunk resides in blocks within the partially-read block cache 200, the data is returned using the cached blocks. The I/O request sent by read scheduler 112 to file system 120 is adjusted to exclude any blocks that are already available in the partially-read block cache 200.

For example, assume that blocks B1 and B3 are stored in cache 200 because of the prior I/O operation involving target chunk 210. Assume that a subsequent request arrives for the target chunk 220 that corresponds to the range B-C. To service this request, the read scheduler 112 would provide data in the range B-Y from the cached data block B3. Read scheduler 112 would then adjust the request to the range Y-C (to exclude the block that was already in cache).

After the adjustments to exclude cached blocks, the new range (Y-C) is adjusted (as described in the previous section) to achieve an aligned I/O operation. In the present example, Y would not be adjusted to achieve aligned I/O, since Y already coincides with a block boundary. However, C would be adjusted up to the block boundary Z of block B4. Thus, the I/O request sent from read scheduler 112 to file system 120 would be for block B4 (e.g. range Y-Z).

When read scheduler 112 receives block B4 from file system 120, read scheduler 112 provides data in the range Y-C from block B4 to the client, and stores block B4 as a partially-read block in partially-read block cache 200. Thus, the client is provided data from the requested range B-C with only a single, one-block, aligned I/O operation.

Trimming Techniques

As explained above, in response to a client's request, the read scheduler 112 may retrieve more data from the file system 120 than what the client actually requested. Thus, the retrieved data must be effectively "trimmed" before it is provided to the client.

According to one embodiment, trimming the file system output involves transferring the partially-read blocks separately from, and to different locations than, the "fully-read" blocks. For example, consider the scenario described above where a client requests the target chunk associated with the boundaries A-B. In this scenario, the read scheduler 112 requests data blocks B1, B2 and B3. Of these three data blocks, B1 and B3 are partially-read blocks and B2 is a fully-read block.

According to one embodiment, read scheduler 112 actually sends three I/O requests to file system 120: one for block B1, one for the contiguous array of fully-read blocks between the partially-read blocks (in this case, B2), and then one for block B3. The I/O request for each partially-read block copies the partially-read block into the partially-read block cache 200 of read scheduler 112. The I/O request for each contiguous array of fully-read blocks copies the continuous array of fully-read blocks directly into a buffer allocated for the client (e.g. buffer 107 of media handler 102).

At this point, the client has block B2 and read scheduler 112 has cached blocks B1 and B3. The client still needs to be provided a portion of B1 and a portion of B3. Read scheduler 112 may then provide to the client the necessary portions of B1 and B3 based on the cached copies of B1 and B3.

Page-Aligned I/O Operations

As mentioned above, file system operations are made more efficient by dividing files into blocks, and performing block-aligned I/O operations. Similarly, within volatile memory, memory management is made more efficient by dividing volatile memory into pages, and performing page-aligned memory management operations. For example, assume that a client has a 10K buffer that consists of ten 1K pages. Assume that a 1K data block is to be copied into the buffer. Under these circumstances, it is much more efficient to copy the 1K data block exactly into one of the 1K pages, than to copy the 1K data block into the buffer at an offset that spans two of the pages. Specifically, if the 1K block is copied at an offset within the client's buffer that aligns with the volatile memory page boundaries, then the file system 120 may be able to directly copy the 1K block from persistent storage 122 into the client's buffer. In contrast, if the 1K block must be copied at an offset within the client's buffer that does not align with the volatile memory page boundaries, then the file system 120 may have to make an intermediary copy of the 1K block before copying the block into the client's buffer.

For example, consider again the scenario in which the client requires the target chunk 210 associated with the range A-B. Assume further that A-B is 2K of data, and that the client has allocated a buffer of two 1K pages (P1 and P2) to store the data. In this scenario, the file system would copy block B2 into an intermediate buffer. Then, from the intermediate buffer, the first portion of B2 would be copied into the second half of P1, and the second portion of B2 to the first half P2. Blocks B1 and B2 would be copied into Partially-read block cache 200. Then, A-W would be copied from the cached B1 into the first half of P1, and X-B would be copied from the cached B3 into the second half of P2. Thus, even though blocks B1, B2 and B3 were read from persistent storage 122 in a block-aligned read operation, copying 2K of data (A-B) into the client's 2K buffer incurs the overhead of several unaligned memory copy operations.

Techniques are provided for reducing the number of unaligned memory copy operations that would be incurred in such scenarios. According to one technique, before allocating a buffer for a read operation, the client communicates to the read scheduler 112 information about the target chunk. The client may communicate, for example, the offset and size of the target chunk. Based on this information, the read scheduler 112 determines the adjusted boundaries, as described above. The read scheduler 112 then communicates back to the client the size of the buffer required to store the data encompassed by the adjusted boundaries. In addition, the read scheduler 112 indicates to the client the offset, within the client's buffer, at which the target chunk will start. The client then allocates a buffer whose size is dictated by the adjusted boundaries, and then sends the read request to the read scheduler 112.

In response to the request, the read scheduler 112 sends a request to the file system 120 based on the adjusted boundaries. The fully-read blocks encompassed by the adjusted boundaries can be copied by the file system 120 directly into the client's buffer in a page-aligned copy operation. Any partially-read blocks are copied into the partially-read block cache 200 in anticipation of future requests, and the appropriate portions of the partially-read blocks are copied into the client's buffer.

After these page-aligned copy operations, a portion of the client's buffer will contain data other than the target chunk. However, the existence of such data does not interfere with the client's operation because the client has been provided the offset, into the client's own buffer, at which data of the requested target chunk begins.

In the example given above, the client allocates a buffer based on the adjusted boundaries. As a result, both the head of the buffer and the tail of the buffer may contain space that is not used to store the target chunk. Alternatively, the client may be instructed to allocate a buffer that is the size of the target chunk plus a front offset, where the front offset is the offset of the start of the target chunk within the storage block that contains the start of the target chunk. For example, the buffer allocated to store A-B may be the size of A-B plus the offset of A within B1. When a buffer size is selected in this manner, the start of the client buffer will still include some unused space, but the end of the client buffer will end exactly at the end of the target chunk.

Example of Page-Aligned Copy Operation

For the purpose of illustrating the technique, described above, for performing a page-aligned copy operation, consider again the scenario in which a client desires the target chunk 210 defined by the boundaries A-B. Assume that the block and page sizes are 1K, and that A corresponds to an offset of 512, and B corresponds to an offset of 2560. Prior to allocating a buffer to receive the target chunk 210, the client communicates the boundaries 512 and 2560 to the read scheduler 112. The read scheduler 112 determines that, to achieve a block-aligned read operation, the boundaries need to be expanded to T-Y (i.e. 0 and 3072). The 0-3072 boundaries encompass exactly three blocks, so the client will need a buffer that is large enough to store three blocks (even though the client only desires 2K of data). The 3K buffer size is communicated from the read scheduler 112 to the client, and the client allocates a buffer that is 3K in size.

In addition to the buffer size, the read scheduler 112 communicates to the client the offset, within the buffer, at which the data of the target chunk 210 will begin. In the present example, point A is 512 bytes into block B1. Under these circumstances, the read scheduler 112 would communicate to the client that the target chunk 210 will begin 512 bytes into the buffer.

After allocating the buffer, the client sends a request for the target chunk 210 to read scheduler 112, identifying the buffer that was allocated to receive the data. Read scheduler 112 issues the appropriate requests to the file system 120, and file system 120 responds by directly loading block B2 into the specified buffer (at offset 1024), and directly loading blocks B1 and B3 into partially-read block cache 200. The appropriate portions of blocks B1 and B3 are then copied to the appropriate locations in the client's buffer. Specifically, section A-W of B1 is copied into the client's buffer beginning at offset 512. Section X-B of block B3 is copied into the client's buffer beginning at offset 2048. The client may then read target chunk 210 out of its buffer, starting at the offset previously indicated by the read scheduler 112 (i.e. the 512 byte offset).

As mentioned above, the size of the client's buffer may alternatively be based on the size of the target data plus a front offset. In the present example, the buffer size would be established based on the size of range 512 and 2560 plus the front offset 512. Thus, the client would allocate a buffer of 2560 bytes, rather than 3K bytes. All of the memory operations would be the same as described above, except that there would be no unused space at the end of the client's buffer.

Handling Overlapping Requests

According to one embodiment, as the read scheduler 112 moves requests from the new request queue 118 to the scheduled request queue 116, the read scheduler 112 expands the requests to achieve block aligned and page aligned I/O operations. Thus, as the request for target chunk 210 is moved from the new request queue 118 to the scheduled request queue 116, the read scheduler 112 expands the request to encompass three I/O operations: reading block B1 into partially-read block cache 200, reading block B2 into client buffer 107, and reading block B3 into partially-read block cache 200.

It is possible that one or more of the I/O operations required by a newly-received request is identical to or overlapping with I/O operations required by other requests already received by read scheduler 112. According to one embodiment, read scheduler 112 looks for such overlaps and, when such overlaps occur, establishes a "companion" relationship to avoid redundant retrieval of the same data.

Specifically, in one embodiment, a first request is established as a companion to a second request if (1) the data required by first request is a proper subset of the data required by the second request (including the situation where both requests require exactly the same data), and (2) the deadline associated with the first request is not earlier than the deadline associated with the second request. When these two conditions are satisfied, the first request does not have a separately positioned entry in the scheduled request queue 116. Rather, the first request is identified as a companion of the second request, and is fulfilled at the time that the second request is fulfilled.

Finding Companions in the Scheduled Request Queue

According to one embodiment, when a new request is to be placed on the scheduled request queue 116, a scan of the scheduled request queue 116 is made to determine whether (1) the new request qualifies as a companion to any previously-received requests with the same or earlier deadlines, and/or (2) any previously-received requests with the same or later deadlines qualify as companions to the new request. If the former, then the new request is added as a companion to the previously-received request. If the latter, then an entry for the new request is added to the scheduled request queue 116 based on the deadline associated with the new request, and the previously-received request that qualifies as a companion is converted into a companion of the new request (and therefore will not have a separately scheduled entry on the scheduled request queue 116).

Because read scheduler 112 maintains a global scheduled request queue 116 that potentially includes the requests of many data handlers, the likelihood that a request will have companion relationships is significantly higher than situations, for example, where each data handler manages its own request queue. For example, assume that media handler 102 is playing a movie, issuing requests to read video data to scheduled data handler 106, and issuing requests to read audio data to scheduled data handler 108. If the audio is interleaved with the video within the movie file, there is a relatively high likelihood that at least some of the audio I/O requests from scheduled data handler 108 will qualify as companions to the video I/O requests issued by scheduled data handler 106.

Finding Companions in the In-Flight List

According to one embodiment, prior to checking for companion relationships in the scheduled request queue 116, a scan of the in-flight list 114 is made to determine whether the new request qualifies as a companion to any requests in the in-flight list. If the new request qualifies as a companion to any requests in the in-flight list, then the new request is added as a companion to the appropriate request in the in-flight list 114. Under these circumstances, the read scheduler 112 does not even need to put an entry for the new request on the scheduled request queue 116. When the data arrives for the previously-received request in the in-flight list 114, the data is used to fulfill both the previously-received request and the new request.

Incoming Request Processing Example

Using the techniques described above, various operations and determinations are performed by read scheduler 112 to process a newly-arrived request. According to one embodiment, the read scheduler 112 handles a new request according to the following sequence:

(1) the range of data required by a new request is adjusted to achieve block and page aligned I/O operations;

(2) the in-flight list is checked to see if the new request qualifies as a companion to an in-flight request;

(3) if the new request is not a companion to any in-flight request, then starting at the head of the scheduled request queue, scan the scheduled request queue to see if the new request qualifies as a companion to a request with an earlier deadline;

(4) if the new request does not qualify as a companion to a request with an earlier deadline, then insert an entry for the new request into the scheduled request queue; and (5) scan the remainder of the scheduled request queue for entries with later deadlines to see if any entries with later deadlines qualify as a companion to the new request.

This sequence of processing a new request is merely exemplary. The actual sequence in which the read scheduler 112 handles newly-arrived requests may vary from implementation to implementation.

Hardware Overview

Figure 3:
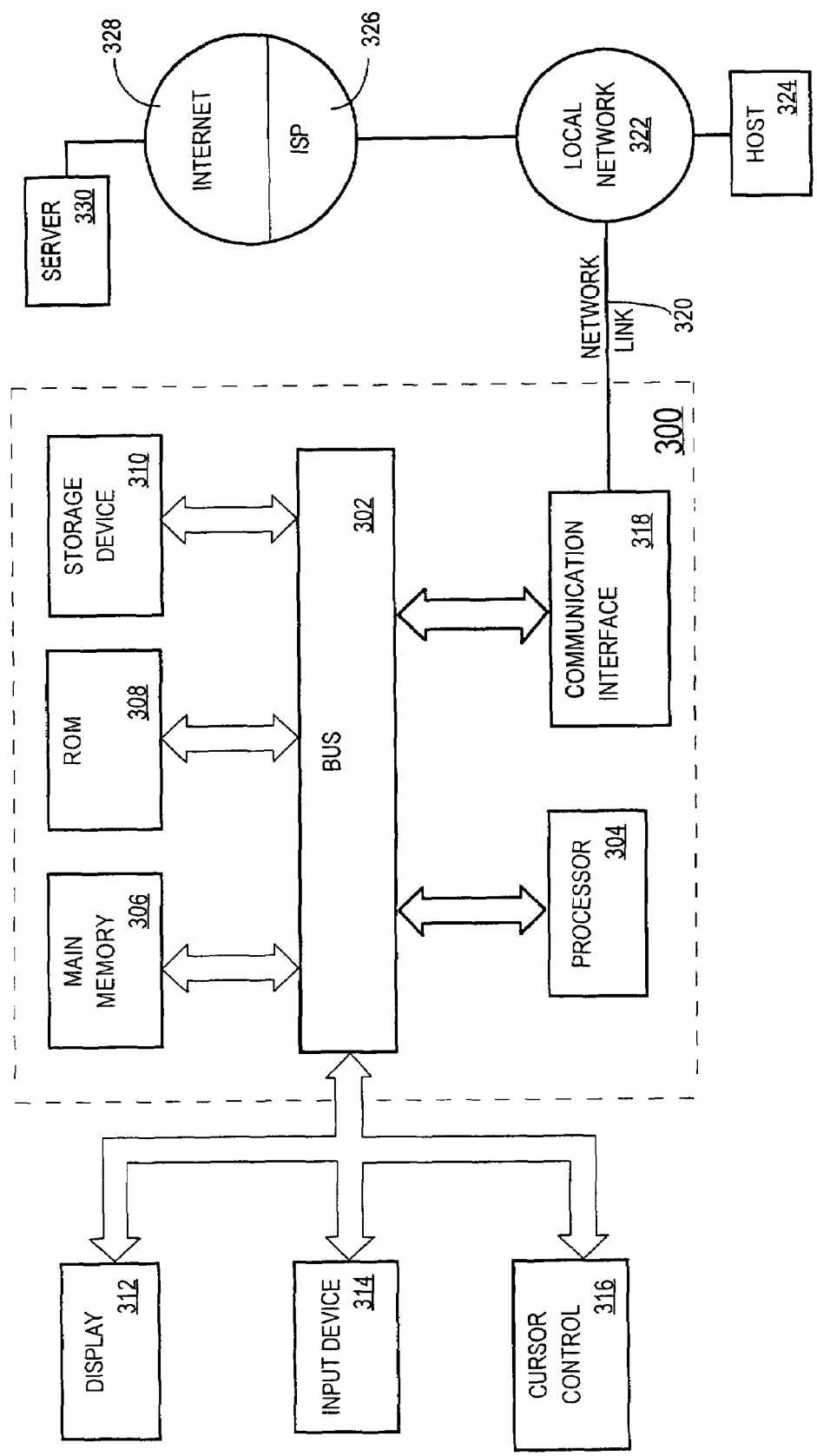
FIG. 3 is a block diagram of a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of performing I/O operations, the method comprising:
   receiving from a client a request, to be sent to a file system, for a target chunk;
   wherein data managed by the file system is divided into data blocks;
   wherein the target chunk has a first start boundary and a first end boundary between which said target chunk is stored in said file system;
   wherein the first end boundary of the target chunk does not coincide with a block boundary of the data blocks managed by the file system;
   in response to said request for the target chunk, and prior to requesting the target chunk from the file system, determining adjusted boundaries based on the first start boundary and the first end boundary;
   wherein the adjusted boundaries include a second start boundary and a second end boundary;
   wherein the second end boundary is different from the first end boundary;
   wherein the adjusted boundaries (a) encompass the target chunk, and (b) coincide with block boundaries;
   in response to the request, submitting one or more requests to the file system, wherein the one or more requests are for all data blocks within the adjusted boundaries; and
   receiving from the file system, in response to the one or more requests, the data blocks within the adjusted boundaries; and
   based on the data blocks within the adjusted boundaries, responding to said request by providing to the client the target chunk;
   wherein the step of determining adjusted boundaries based on the first start boundary and the first end boundary includes designating a closest block boundary that follows the first end boundary as the second end boundary such that the second start boundary and the second end boundary encompasses the target chunk;
   wherein the method is performed by a computing device programmed to be a special purpose machine pursuant to instructions from program software.

2. The method of claim 1 wherein:
   the steps of receiving and submitting are performed by an intermediary between the client and the file system; and
   the method further comprises caching at the intermediary the data blocks, received from the file system, that (a) are within the adjusted boundaries, and (b) include data that does not fall within the target chunk.

3. The method of claim 2 further comprising:
   in response to a subsequent request for a second target chunk from the file system, performing the steps of
   determining whether any of the cached data blocks include data that belongs to the second target chunk; and
   if any of the cached data blocks include data that belongs to the second target chunk, then answering the subsequent request without re-retrieving from the file system the cached data blocks that include data that belongs to the second target chunk.

4. The method of claim 3 wherein the subsequent request for the second target chunk is from the client that issued the request for the target chunk.

5. The method of claim 3 wherein the subsequent request for the second target chunk is from a different client than the client that issued the request for the target chunk.

6. The method of claim 1 wherein:
   the step of submitting one or more requests to the file system includes requesting that said file system copy all fully-read data blocks directly into a buffer of the client;
   the step of receiving the data blocks within the adjusted boundaries includes
      receiving, into a cache maintained by an intermediary, any partially-read data blocks within the adjusted boundaries; and
   wherein the step of providing to the client the target chunk includes copying into the buffer of the client at least a portion of the partially-read data blocks stored in said cache.

7. The method of claim 1 further comprising:
   receiving from the client data that identifies the target chunk; and
   sending to the client data that indicates
      a size for a buffer to be used by the client for receiving the target chunk; and
      an offset into the buffer, the offset into the buffer indicating where data for the target chunk will begin.

8. A computer-readable storage medium storing one or more sequences of instructions which, when executed by one or more processors, causes the one or more processors to perform the method recited in claim 1.

9. A computer-readable storage medium storing one or more sequences of instructions which, when executed by one or more processors, causes the one or more processors to perform the method recited in claim 2.

10. A computer-readable storage medium storing one or more sequences of instructions which, when executed by one or more processors, causes the one or more processors to perform the method recited in claim 3.

11. A computer-readable storage medium storing one or more sequences of instructions which, when executed by one or more processors, causes the one or more processors to perform the method recited in claim 4.

12. A computer-readable storage medium storing one or more sequences of instructions which, when executed by one or more processors, causes the one or more processors to perform the method recited in claim 5.

13. A computer-readable storage medium storing one or more sequences of instructions which, when executed by one or more processors, causes the one or more processors to perform the method recited in claim 6.

14. A computer-readable storage medium storing one or more sequences of instructions which, when executed by one or more processors, causes the one or more processors to perform the method recited in claim 7.

15. A method of performing I/O operations, the method comprising:
   receiving from a client a request, to be sent to a file system, for a target chunk;

wherein data managed by the file system is divided into data blocks;

wherein the target chunk has a first start boundary and a first end boundary between which said target chunk is stored in said file system;

wherein the first end boundary of the target chunk does not coincide with a block boundary of the data blocks managed by the file system;

in response to said request for the target chunk, and prior to requesting the target chunk from the file system, determining adjusted boundaries based on the first start boundary and the first end boundary;

wherein the adjusted boundaries include a second start boundary and a second end boundary;

wherein the second end boundary is different from the first end boundary;

wherein the adjusted boundaries (a) encompass the target chunk, and (b) coincide with block boundaries;

in response to the request, submitting one or more requests to the file system, wherein the one or more requests are for all data blocks within the adjusted boundaries; and receiving from the file system, in response to the one or more requests, the data blocks within the adjusted boundaries; and based on the data blocks within the adjusted boundaries, responding to said request by providing to the client the target chunk;

wherein the step of submitting one or more requests to the file system includes requesting that said file system copy all fully-read data blocks directly into a buffer of the client;

wherein the step of receiving the data blocks within the adjusted boundaries includes
  receiving, into a cache maintained by an intermediary, any partially-read data blocks within the adjusted boundaries;

wherein the step of providing to the client the target chunk includes copying into the buffer of the client at least a portion of the partially-read data blocks stored in said cache;

wherein the method is performed by a computing device programmed to be a special purpose machine pursuant to instructions from program software.

16. The method of claim 15 wherein:
the steps of receiving and submitting are performed by an intermediary between the client and the file system; and
the method further comprises caching at the intermediary the data blocks, received from the file system, that (a) are within the adjusted boundaries, and (b) include data that does not fall within the target chunk.

17. The method of claim 16 further comprising:
in response to a subsequent request for a second target chunk from the file system, performing the steps of
  determining whether any of the cached data blocks include data that belongs to the second target chunk; and
  if any of the cached data blocks include data that belongs to the second target chunk, then answering the subsequent request without re-retrieving from the file system the cached data blocks that include data that belongs to the second target chunk.

18. The method of claim 17 wherein the subsequent request for the second target chunk is from the client that issued the request for the target chunk.

19. The method of claim 17 wherein the subsequent request for the second target chunk is from a different client than the client that issued the request for the target chunk.

20. The method of claim 15 further comprising:
receiving from the client data that identifies the target chunk; and
sending to the client data that indicates
  a size for a buffer to be used by the client for receiving the target chunk; and
  an offset into the buffer, the offset into the buffer indicating where data for the target chunk will begin.

21. A computer-readable storage medium storing one or more sequences of instructions which, when executed by one or more processors, causes the one or more processors to perform the method recited in claim 15.

22. A computer-readable storage medium storing one or more sequences of instructions which, when executed by one or more processors, causes the one or more processors to perform the method recited in claim 16.

23. A computer-readable storage medium storing one or more sequences of instructions which, when executed by one or more processors, causes the one or more processors to perform the method recited in claim 17.

24. A computer-readable storage medium storing one or more sequences of instructions which, when executed by one or more processors, causes the one or more processors to perform the method recited in claim 18.

25. A computer-readable storage medium storing one or more sequences of instructions which, when executed by one or more processors, causes the one or more processors to perform the method recited in claim 19.

26. A computer-readable storage medium storing one or more sequences of instructions which, when executed by one or more processors, causes the one or more processors to perform the method recited in claim 20.

* * * * *